United States Patent [19]
Krappitz et al.

[11] Patent Number: 4,911,608
[45] Date of Patent: Mar. 27, 1990

[54] DEVICE FOR LIFTING AT LEAST ONE MATERIAL STACK

[75] Inventors: Heinz Krappitz, Reinbek; Johannes Wolfrum, Himmelkron; Uwe Gerstmann, Gronau, all of Fed. Rep. of Germany

[73] Assignee: B. A. T. Cigarettenfabriken, Hamburg, Fed. Rep. of Germany

[21] Appl. No.: 203,785

[22] Filed: Jun. 2, 1988

[30] Foreign Application Priority Data

Jun. 3, 1987 [DE] Fed. Rep. of Germany ....... 3718601

[51] Int. Cl.⁴ .............................................. B65G 59/02
[52] U.S. Cl. .................................... 414/796; 294/87.1; 294/907; 414/796.9; 414/907; 414/929
[58] Field of Search ...................... 294/87.1, 88, 103.1, 294/907; 414/71, 120, 114, 796, 796.2, 796.9, 907, 929; 901/47

[56] References Cited

U.S. PATENT DOCUMENTS

| | | | |
|---|---|---|---|
| 4,423,998 | 1/1984 | Inaba et al. | 294/907 X |
| 4,551,053 | 11/1985 | Ishibashi | 414/907 X |
| 4,723,884 | 2/1988 | Brinker et al. | 414/120 |
| 4,746,255 | 5/1988 | Roccabianca et al. | 414/71 X |
| 4,787,810 | 11/1988 | Cawley et al. | 414/71 X |

FOREIGN PATENT DOCUMENTS

| | | |
|---|---|---|
| 0045174 | 2/1982 | European Pat. Off. . |
| 2828860 | 1/1979 | Fed. Rep. of Germany . |
| 3519580 | 3/1987 | Fed. Rep. of Germany . |
| 3627670 | 3/1988 | Fed. Rep. of Germany . |
| 397178 | 2/1966 | Switzerland ........................ 294/87.1 |

Primary Examiner—Robert J. Spar
Assistant Examiner—Janice Krizek
Attorney, Agent, or Firm—Armstrong, Nikaido, Marmelstein, Kubovcik & Murray

[57] ABSTRACT

A device for lifting at least one material stack from a support, in particular a stack of blanks from an intermediate support or bottom support in the tobacco industry, comprises the following features: a gripper is guided freely movable in all directions by an industrial robot; the gripper comprises at least one clamping element which is displaceable in the vertical direction and adapted to be placed on the or each stack, at least one elastically deformable finger insertable between the stack and the intermediate or bottom support as well as sensors for detecting the distance between the gripper and the stack; a control circuit including at least one logic unit evaluates and processes the output signals of the sensors and controls the movement of the gripper from a predetermined starting position into the lifting position, the clamping of a stack between a finger and a clamping element, and the subsequent lifting and the carrying away of the or each stack.

11 Claims, 9 Drawing Sheets

DEVICE FOR LIFTING AT LEAST ONE MATERIAL STACK

BACKGROUND OF THE INVENTION

1. Field of the Invention

The invention relates to a device for lifting at least one material stack from a support, in particular at least one stack of blanks from an intermediate support or a bottom support in the tobacco industry.

2. Description of the Prior Art

Although corresponding problems also occur with other types of material stacks, for example in the paper industry, as well as when handling foils, sheets, films and similar webbed structures, hereinafter the tobacco industry is the view point taken where untied stacks of blanks, in particular pack or carton blanks, must be moved; the lack of cohesion of the individual blanks in the stack, the risk of damage to the sensitive cardboard surfaces and finally the danger of bending the edges represent demands which must be taken into account in the development of a corresponding automatic device for lifting and transporting away a stack of blanks.

Also of importance is that, in general a plurality of stacks is arranged on a pallet in a horizontal direction adjacent each other to form a "stack layer" whilst in the vertical direction the various stack layers, often up to six or seven layers, are separated in each case by an intermediate support of paper, cardboard, wood or plastic sheet. It must therefore be ensured that at least one stack of each stack layer can be gripped, raised from the associated intermediate support and transported away without any danger of damaging the sensitive individual blanks.

SUMMARY OF THE INVENTION

The invention is thus based on the problems of providing a device for lifting a material stack from a support in which the aforementioned requirements are met.

In particular, a device is to be proposed with which at least one material stack can be safely and reliably gripped, lifted and transported away without any danger of damaging the sensitive material, in particular package blanks in the tobacco industry.

The invention therefore proposes in a device for lifting at least one material stack from a support, in particular a stack of blanks from an intermediate or bottom support in the tobacco industry, the improvement in which a gripper is guided freely movably in all directions by an industrial robot; the gripper comprises at least one clamping element displaceable in a vertical direction and adapted to be placed on the stack, at least one elastically deformable finger insertable between the stack and the intermediate or bottom support, and sensors for detecting the distance between the gripper and the stack., and an evaluating means processing the output signals of the sensors controls the movement of the gripper from a predetermined starting position into the lifting position, the clamping of the stack between the finger and the clamping element and the lifting and carrying away of the or each stack.

Expedient embodiments are defined by the features of the subsidiary claims.

The advantages achieved with the invention are based on the following mode of operation: In the tobacco industry pallets with pack or carton blanks are delivered by truck., during said transport as a rule two pallets are stacked above each other. The pallets are lifted individually off the trucks so that in the goods-receiving section the plastic sheets serving as protection can be removed by hand. The "undressed" pallets are taken over by a driverless transport system and put down in the operation region of a certain constructional form of an industrial robot, namely a portal robot. The gripper of this industrial robot is moved to the pallet and positioned on a stack of blanks. After the gripper has gripped at least one stack the industrial robot removes the loaded gripper so that on further transport there is no danger of collision with other stacks or other pallets.

The industrial robot with the loaded gripper is moved up to the manufacturing machine to be charged., then the stacks are put down so that the blanks or each stack can be separated and folded into cigarette packs or cartons.

Some blank suppliers load the pallets by hand; in addition, during transport of the pallets the blanks can be displaced so that a reliable constant positioning of the stacks cannot be expected; additional position deviations occur when the pallets are put down. Also, the dimensions of the pallets themselves have great tolerances. Consequently, the entering of a fixed approach positions for the gripper, for instance in the manner of a Teach-In, would lead to collisions with the stacks and damage of the blanks so that reliable gripping is practically impossible. However, to enable the industrial robot to adapt itself within certain limits to different stack positions and to permit reliable gripping, the gripper is equipped with sensors for position detection and distance measurement so that the exact location and proper form of each stack can be detected and thus each stack can be gripped and lifted with the necessary care.

In principle, the sensors can operate inductively, capacitively and with ultrasonic means; for this use, however, the switching interval of capacitive sensors is too small, whereas ultrasonic sensors have a switching interval which is too large and inductive sensors cannot be used for non-metals. In a preferred embodiment optical reflex sensors are therefore used as sensors, i.e. light-emitting diodes with phototransistors. The light for the reflex sensors is conducted via optical fiber cables so as to keep overall size of the gripper small.

The manufacturing machines to be charged as used in the tobacco industry at present process about 400 blanks per minute., one stack of blanks contains about 500 blanks. To avoid stoppage of the manufacturing machine, taking account of the distance covered by the industrial robot, the gripper must be able to transport three complete stacks in one duty cycle, i.e. from the start at the manufacturing machine, through the movement to the pallet, positioning of the gripper, gripping of the or each stack, returning to the manufacturing machine and unloading.

The gripping of three stacks in one duty cycle necessary due to the speed of the manufacturing machine involves, however, further design stipulations; for as a rule on a pallet there are eleven stacks adjacent to each other so that when removing three stacks each time at the end of each stack row only one stack pair remains. For this reason the gripper must be designed so that two stacks can also be transported. These stipulations can be met by appropriate design of the gripper with the necessary number of elastically deformable fingers, pressing and clamping elements, and the corresponding sensor placement.

In view of the performance, in particular the load-carrying capacity, of commercially available industrial robots on the one hand and the weight of about 7.5 kg for three stacks on the other hand, the gripper itself should have only a relatively low weight; this is taken into account by using substantially only lightweight strip-shape components for the support structure of the gripper in conjunction with light sensors and small clamping elements which are actuated pneumatically.

The elastically deformable fingers are advanced by means of a drive cylinder relatively to the gripper and thereby inserted between the lowermost blank of the stack and the intermediate or bottom support.

According to a preferred embodiment each finger has a wedge shape with rounded tip which is expediently further ground to facilitate the insertion of the finger between the lowermost blank of the stack and the bottom or intermediate support. In addition, on insertion the finger must be highly flexible but on the other hand stiff enough to take up the stack weight and be able to apply a clamping force. The finger can be made from a steel sheet with the desired properties.

Due to the wedge shape of the tips of the fingers the area moment of inertia decreases towards the tips. As a result, in spite of the same material thickness a flexibility increasing towards the tips is achieved whereas at the rear in the support region the stiffness increases.

To give the gripper the desired stiffness in spite of the low weight required the loadbearing parts are formed by box sections or angular sections.

According to a preferred embodiment in addition to the clamping elements which engage the stack in conjunction with the fingers additional pressing elements are provided which are placed on the uppermost blank of each stack prior to the clamping elements. These pressing elements lead to a stabilizing of the stack during the insertion movement of the fingers so that individual blanks or the entire stack cannot slipout; in addition, at least, short stacks are fanned out at their end faces remote from the pressing elements, facilitating the introduction of the finger into the resulting gap between the bottom or intermediate support and the lowermost blank of the stack.

The sensors mounted on the gripper detect stop-points and errors, i.e. the gripper is controlled not only by fixed coordinates but also by the geometry of the stack to be gripped. An alarm signal is only emitted when the deviations of the geometry from the predetermined properties of the stacks on the pallet exceed a certain tolerance range, said alarm signal alerting the operator so that he can remedy the fault and start the cycle again, in particular bring the gripper up to the stack on the pallet.

Possibly faults are in particular excessive deviations in the position of the pallet and thus of the stacks, displaced individual stacks and extremely high or extremely low stacks which can no longer be satisfactorily grasped by the gripper.

When one stack layer has been completely cleared the next necessary step is the removal of the intermediate support before at least one stack of the next stack layer can be gripped. For this purpose the gripper is provided with suction heads disposed at the rear side thereof. By a pivot movement of the gripper out of the normal position through 90° the suction heads can be placed on the intermediate support and thereafter subjected to vacuum so that the intermediate support adheres to the suction heads., the intermediate support can then be removed by a sort of "peeling movement" from the next stack layer.

To apply a vacuum to the suction heads either a vacuum conduit is laid into the gripper or the compressed air already present in the gripper is converted to reduced pressure by means of a jet pump.

BRIEF DESCRIPTION OF THE DRAWINGS

The invention will be explained hereinafter in detail with the aid of examples of embodiment with reference to the attached schematic drawings, wherein.

DESCRIPTION OF THE PREFERRED EMBODIMENTS

Figure 1:
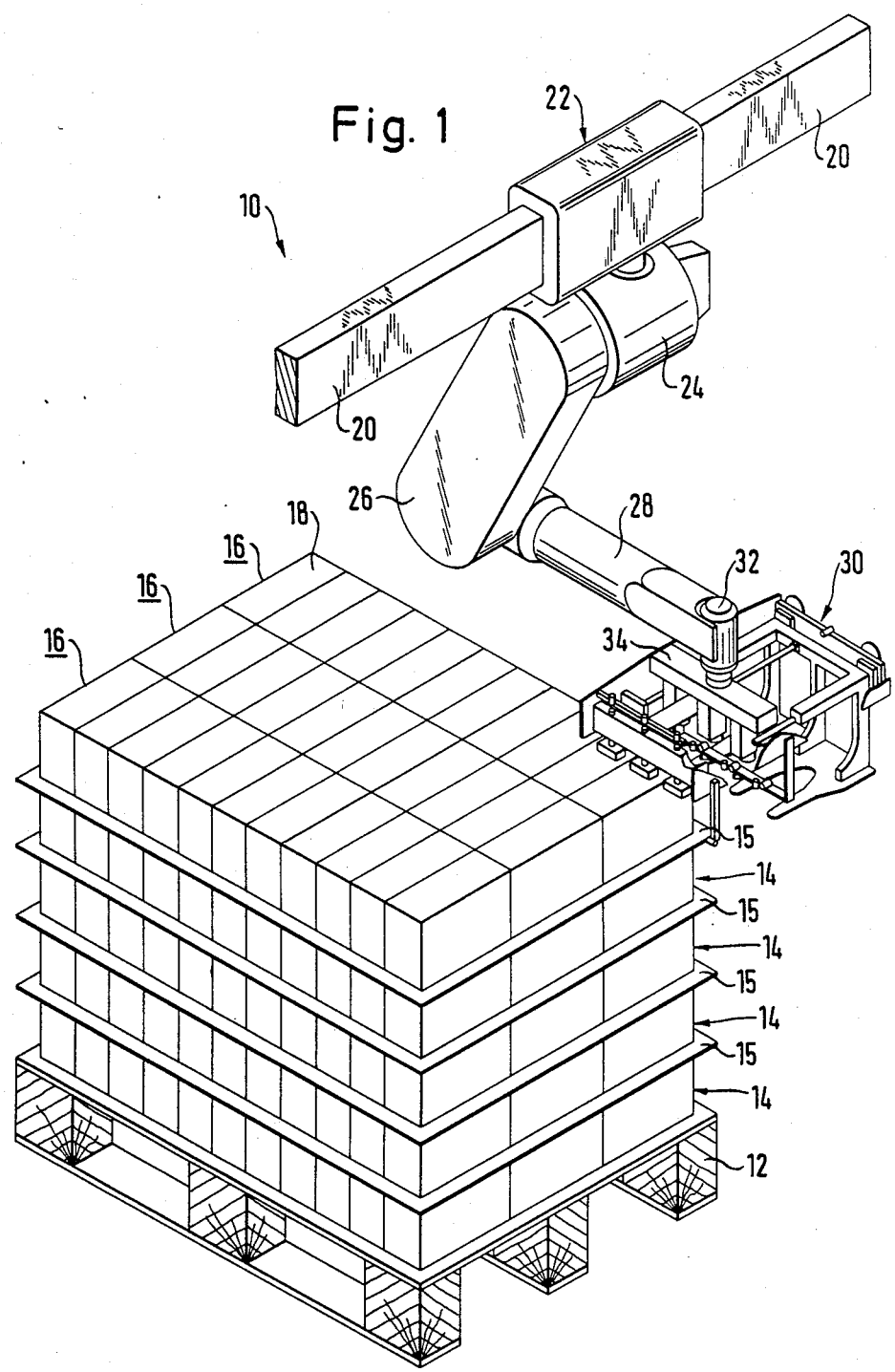
FIG. 1 is a perspective view of a pallet with five layers of blank stacks and a device for lifting and transporting away at least one stack.

The device shown in FIG. 1 and denoted generally by reference numeral 10 serves for lifting and transporting away two or three stacks of blanks each arranged in individual layers on a pallet 12. In FIG. 1 five stack layers 14 are shown each consisting of three stack rows 16 each comprising eleven individual stacks 18 separated from each other by intermediate supports 15 of paper, cardboard, wood or plastic.

The embodiment described here relates to blanks for hinge-lid packs and this must be taken into account in the spatial arrangement, still to be explained, of the sensors of the device 10. However, in the same manner other pack or carton blanks may be processed if account is taken of this by appropriate arrangement of the sensors.

The device 10 comprises a portal 20 for moving a conventional industrial robot 22 having a plurality of joints for the various arms 24, 26, 28 of the industrial robot 22 so that the tool to be handled by the industrial robot 22, i.e. a gripper 30 still to be explained, can be continuously adjusted in all spatial directions.

Figure 2:
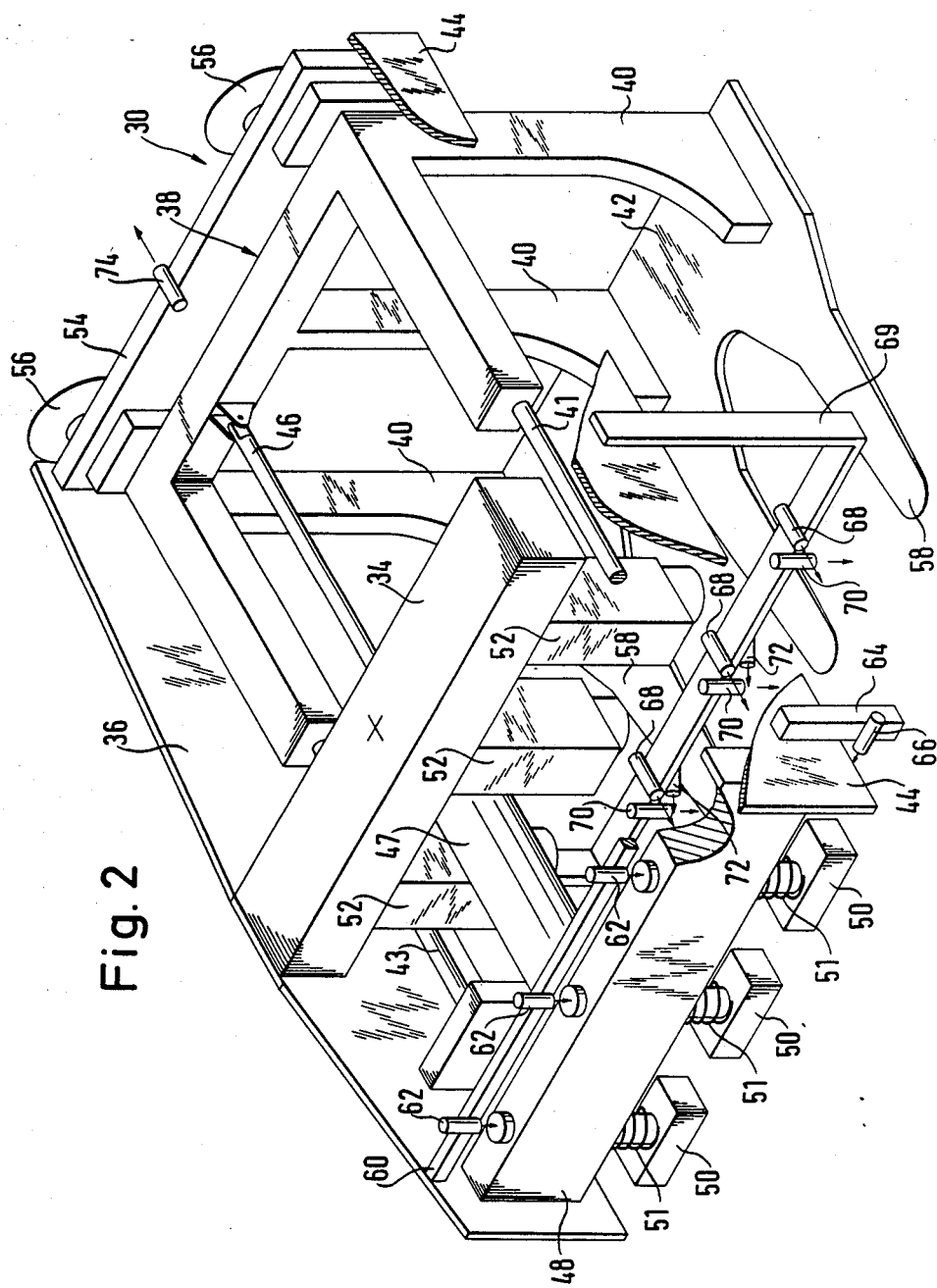
FIG. 2 is a perspective view of a gripper of the device.

The gripper 30 shown to a larger scale in FIG. 2 comprises a substantially box-shaped frame having side walls which are cut away as far as possible to save weight, i.e. formed essentially by webs, angular sections or box sections.

The industrial robot 22 comprises a vertical pin 32 (see FIG. 1) which is mounted on a transverse web (support crossbeam) 34 comprising a box profile of the gripper 30. Said transverse web 34 is rigidly connected to the loadbearing parts, in particular the side walls 36, 44 apparent in FIG. 2. The right side wall 44 of the gripper 30 in the illustration of FIG. 2 is shown only partially.

The side walls 36, 44 are connected to each other by a rear crossbeam 54 and a front crossbeam 48. Between the two side walls 36, 44 there is a carriage 38 comprising a rectangular tube with three vertical supports 40 carrying a bottom 42. The carriage 38 is mounted movably between the rear crossbeam 54 and the front crossbeam 48 on guide rails 41 and 43. The carriage 38 is connected to a pneumatic cylinder 47 via a piston rod 46.

In the example of embodiment illustrated three pressing elements 50 are mounted to the end crossbeam 48. The pressing elements 50 are mounted for vertical displacement. The displacement is against a pressure force which is applied by a spring 51, for example a helical spring or a pneumatic accumulator. On the web 34 three pneumatically actuable clamping elements 52 are fixed.

Mounted on the rear crossbeam 54 in the embodiment illustrated are two suction heads 56 which can be actuated by a vacuum conduit (not shown); alternatively, it is also possible to convert the compressed air already present in the gripper 30 by means of a jet pump to subatmospheric pressure for application to the suction heads 56.

The bottom 42 of the gripper is provided in the embodiment illustrated with three flat fingers 58 which face the pressing elements 50 and have a wedge shape with rounded and flattened tip. Said fingers 58 are formed integrally with the bottom 42 and consist of elastically deformable material of high restoring force, in particular spring steel.

Alternatively, the fingers 58 alone may be made from spring steel and are connected to the bottom 42 in a suitable manner.

The gripper 30 is controlled with the aid of sensors whose spatial arrangement and function will be explained in the following with reference to FIGS. 2 and 3.

Arranged above the front crossbeam 48 between the two side walls 36, 44 is a transverse strip 60 on which three sensors 62 are mounted. Said sensors 62 (see also FIG. 3), on lowering the gripper onto the stack layer 14, measure the distance to the uppermost blank of each stack in that on setting down the gripper 30 they measure the spacing of the resiliently mounted pressing elements 50. As a result, the force with which the pressing elements 50 press against the stack is measured indirectly via the characteristic of the spring 51. Said sensors produce a corresponding analog signal which is passed on to a threshold switch (not shown).

Figure 4:
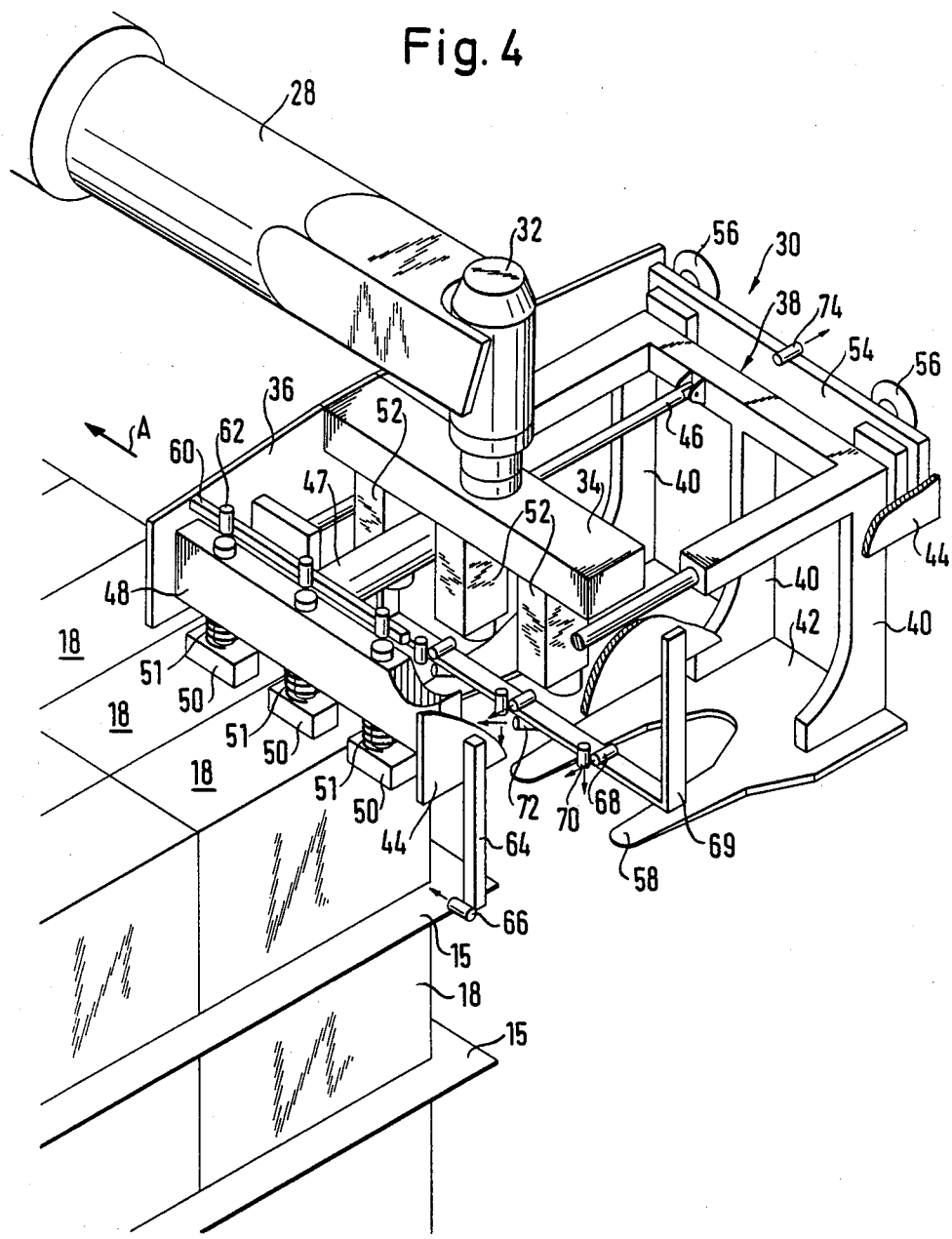
FIG. 4 is a perspective view of the gripper in an initial or starting position at the corner of a blank layer for gripping three stacks of blanks.

On the outer side of the side wall 44 a downwardly projecting angular section 64 is mounted which carriers a sensor 66 arranged in the horizontal direction, see FIG. 4 for determining the distance between the side face of a stack and the gripper 30.

A further U-shaped transverse web 69 is mounted to the sides of the two side walls 36, 44 substantially beneath the transverse web 34 and carries two rows each of three sensors. A first row of sensors 68 measures in a horizontal direction the distance between the sensor and the front end wall of the three stacks 18 (see FIG. 3) whilst downwardly directed sensors 70 measure the distance to the fingers 58 disposed therebelow, thereby detecting a deformation of the fingers 58.

Also arranged on the U-shaped transverse web 69 are two further sensors 72 which are associated with the two left sensors 68, 70 and measure at an angle at the same level as the sensor 66 the distance horizontally to the inclined side face of the two right stacks 18.

Figure 3:
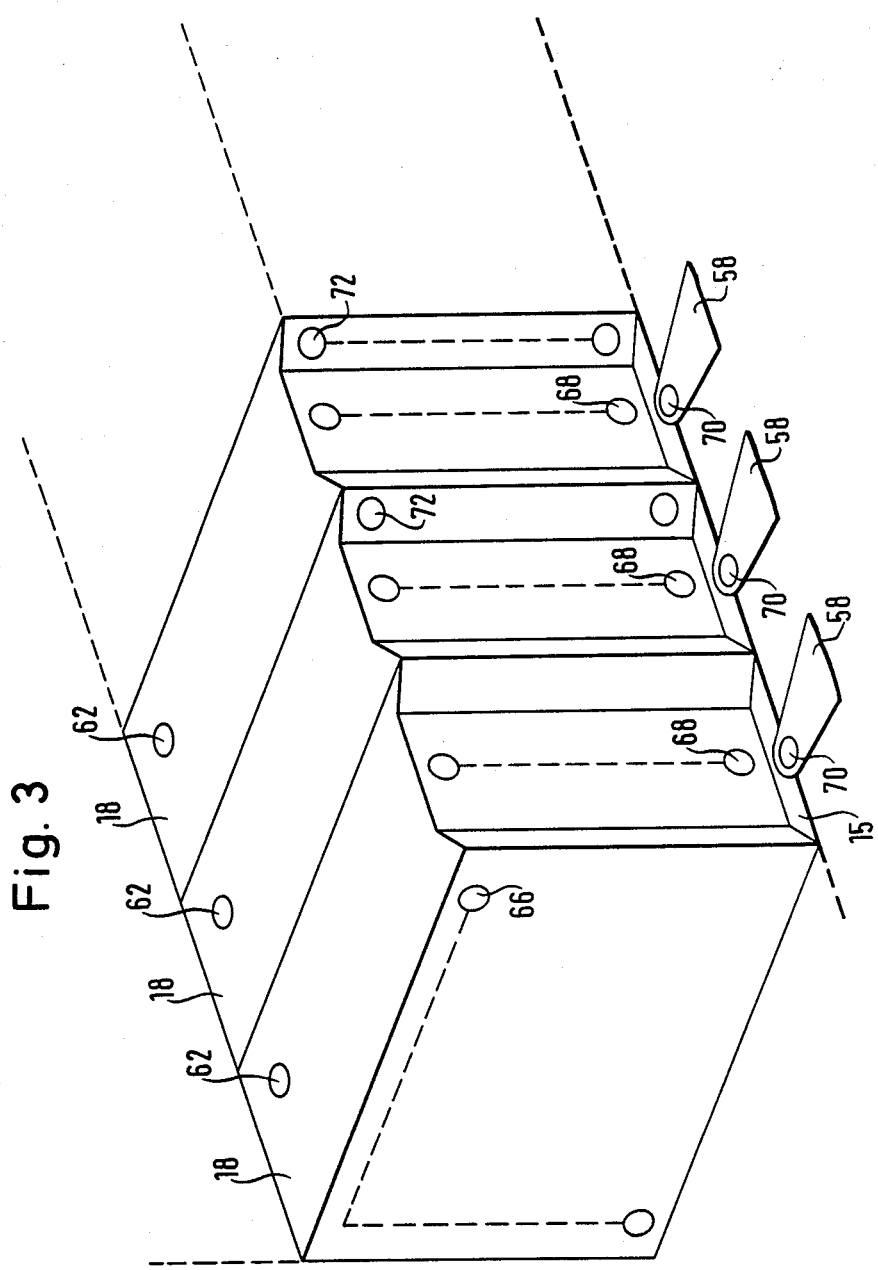
FIG. 3 is a perspective view of three horizontally adjacently arranged stacks of blanks for hinge-lid (HL) packs showing the action directions of the associated sensors.

If three stacks 18 are to be simultaneously gripped, in accordance with the illustration in FIG. 3 the right sensor 72 is sampled to detect the right edge of said stack row; if, proceeding from the left stack 18 having a side face scanned by means of the sensor 66, only two stacks 18 are to be detected then only the sensor 72 is sampled, said sensor being disposed in the illustration in FIG. 3 at the center stack 18.

Finally, on the rear crossbeam 54 between the two suction heads 56 a further sensor 74 is disposed which with corresponding location of the gripper 30 determines the distance to the intermediate support 15, as will be explained in the following.

As sensors optical reflex sensors are used, i.e. lightemitting diodes (transmitters) with phototransistors (receivers), because only these commercially available sensors have the necessary switching range with appropriate accuracy. To keep the gripper 30 compact and light weight, the light for the sensors is conducted via optical fiber cables.

The analog output signals of the sensors are digitized in respective following threshold switches; said threshold switches are coupled to a logic unit which performs a pre-evaluation of the signals and makes the result available to the control circuit of the industrial robot 22 as a return signal.

In addition, the control circuit must switch the various sensor groups directly or indirectly via a further logic unit depending on the movement phase in such a manner that under predetermined previously defined conditions the instantaneous movement can be interrupted or after a sampling block a new movement or the gripping can be initiated. The robot control is also notified of an alarm situation by a reply signal.

The operation sequence will be described hereinafter with reference to FIGS. 4 to 7; wherein the gripper is shown in first through fourth positions, respectively. The gripper 30 is first brought by means of the industrial robot 22 into the starting position shown for example in FIG. 1, i.e. into a position above the upper stack layer 14 on the pallet. For the various stacks to be gripped this starting position is fixedly preprogrammed by means of their coordinates in the robot control, i.e. the gripper 30 moves automatically into a position in which it is relatively close to the stacks 18 to be gripped but even on tolerance fluctuations in the position of the pallet 12 and thus of the stacks 18 there is still no danger of any contact between the stacks 18 and the gripper 30.

As apparent from FIG. 1 and in particular from the enlarged illustration in FIG. 4, in this position the pressing elements 50 are located above the upper blanks of each stack whilst the sensor 66 is opposite the side wall of a corner stack, this being the side wall which lies on the left side in the displacement direction of the gripper 30, still to be illustrated.

Proceeding from this starting position the further control is by means of the output signals of the various sensors, i.e. the gripper 30 is controlled not only by fixed coordinates but also by the actual geometry of the stack 18. An alarm signal is only given when the deviations of the geometry from predetermined values of the stacks on the pallet 12 exceed a certain tolerance range. The operator must then remedy the fault, for example move the pallet somewhat, and restart the program, the gripper 30 thereby again being brought up to the stacks.

If now three stacks 18 are to be grasped and lifted, first the sensor 66 is sampled in order to bring the gripper 30 into the desired position, i.e. the gripper 30 disposed above the stack 18 is displaced in accordance with the illustration of FIG. 4 in the direction of the arrow A, i.e. in the direction of a stack row 16, until the sensor 66 detects the desired distance and thus an exactly defined position of the gripper 30 with respect to the three stacks 18.

Figure 5:
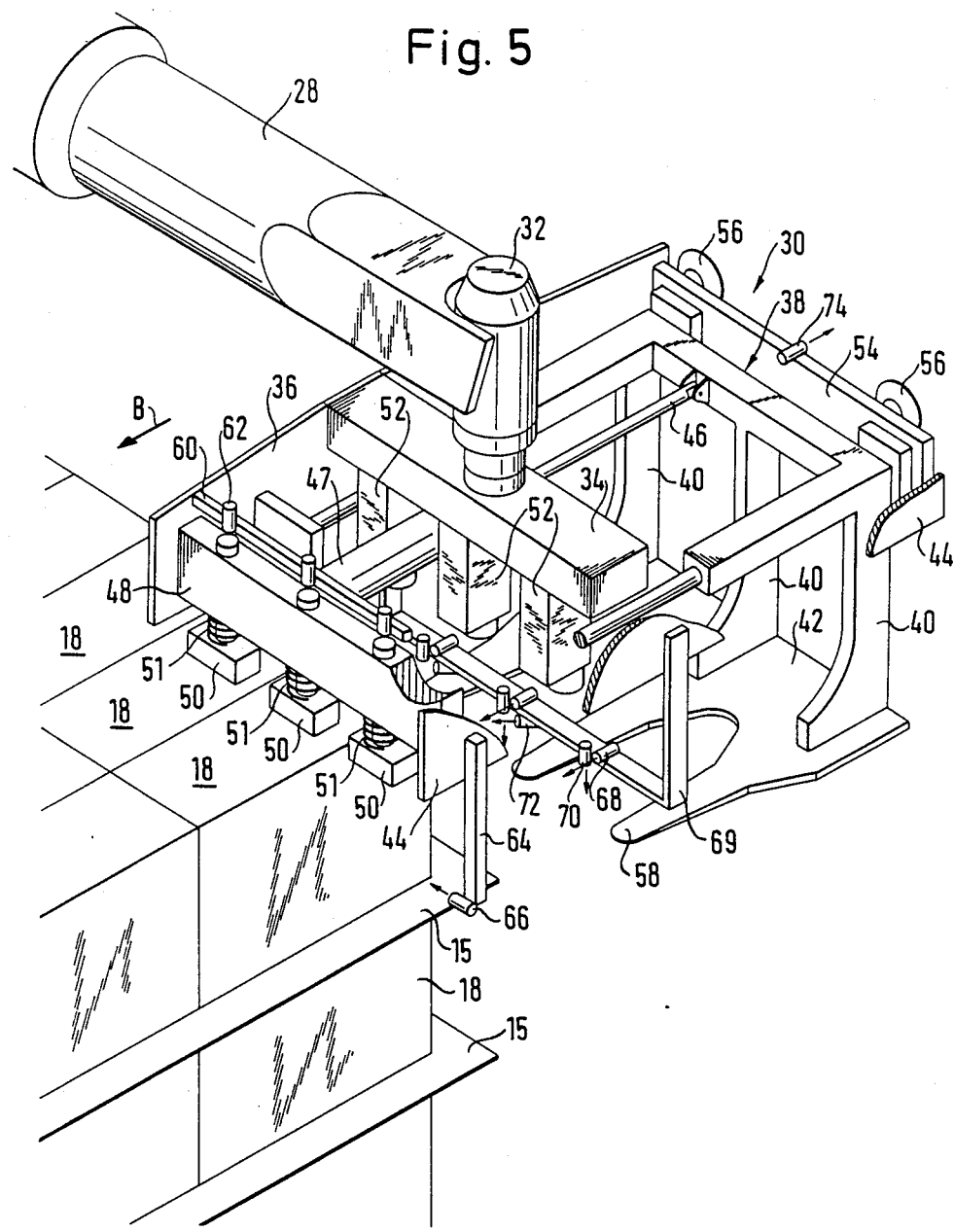
FIG. 5 is a perspective view of the gripper of FIG. 4 in a second position on its movement in the direction of the front end wall of the stack.

Proceeding from this second position, which is shown in FIG. 5, the gripper 30 is then displaced by means of the industrial robot 22 in the direction of the arrow B in FIG. 5, i.e. towards the front end face of the stacks 18, until the sensors 68 detect an exactly defined distance between the gripper 30 and the end face of the stacks 18 to be gripped. The gripper 30 is then stopped in this position, a third position as shown in FIG. 6.

Figure 6:
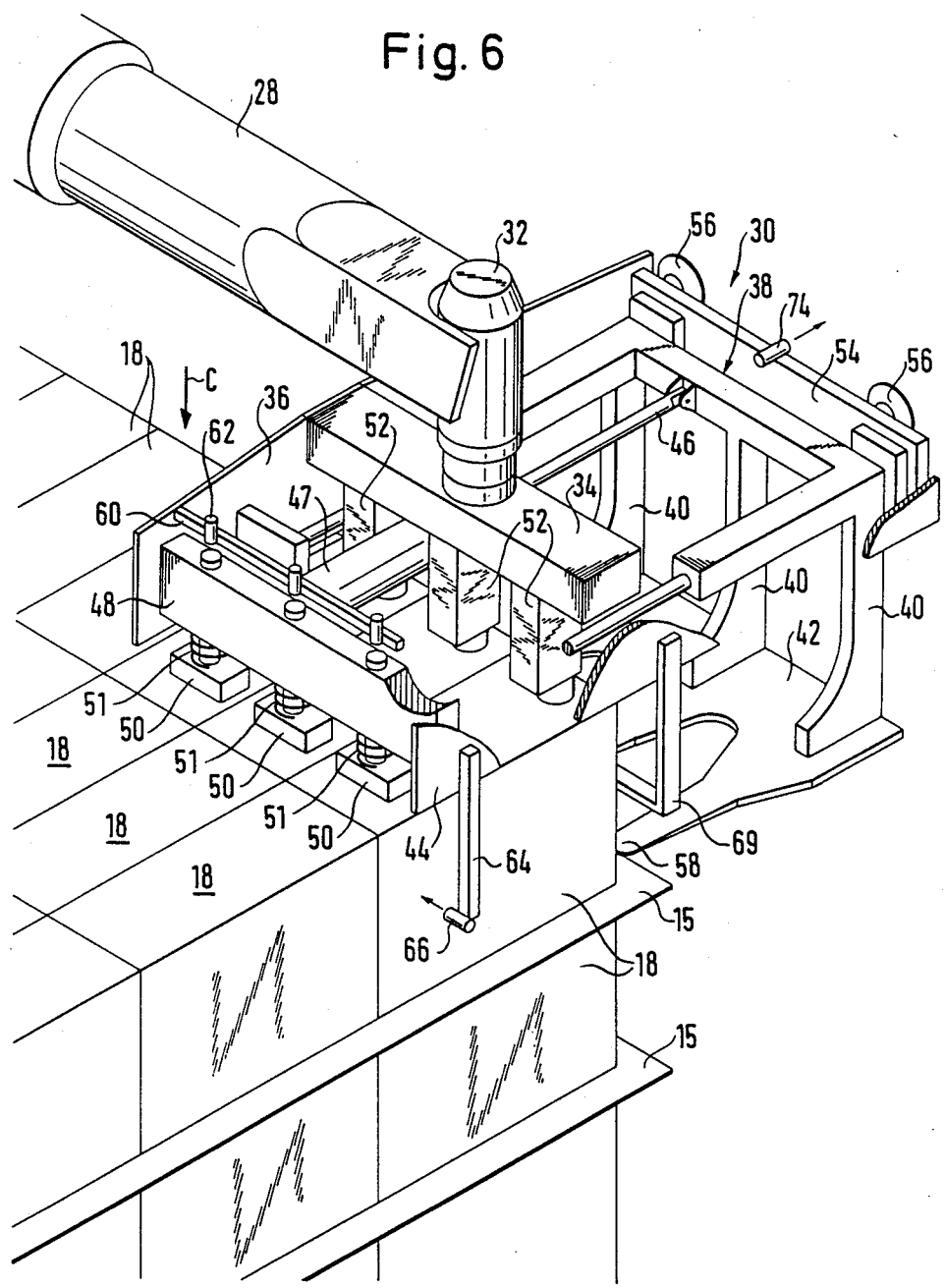
FIG. 6 is a perspective view of the gripper in a third position when the pressing elements are lowered.

The entire gripper 30 is now moved in the direction of the arrow C of FIG. 6 vertically downwardly, the fingers 58 thereby being placed on the intermediate support 15. On contacting the intermediate support 15 the fingers 58 are bent slightly upwardly. The position change of the tips of the fingers 58 is detected by the sensors 70. At the exact height of the stack 18 the pressing elements 50 are simultaneously pressed onto the upper blanks of the stacks and fix in this manner the position of the blanks. In addition, this also fans out the blanks somewhat at the end faces. The sensors 62 serve to check the height of the individual stacks 18 and monitor the spring movement of the resiliently actuated pressing elements 50. When the spring characteristic is known it is then possible to deduce the pressure force on the stack for a certain spring deformation. The movement in the direction of the arrow C is thus also controlled in dependence upon the force; this is important to ensure a minimum force preventing the slipping of the stacks 18 in the gripping operation. The movement of the gripper 30 in the direction of the arrow C is interrupted when the sensors 62 report the desired values and the sensors 70 have indicated a minimum bending of the fingers 58, at the latest, however, when the maximum bending of a finger is achieved, indicated by the sensor 70, or the maximum pressure force on one of the pressing elements 50 occurs, indicated by the sensor 62.

Figure 7:
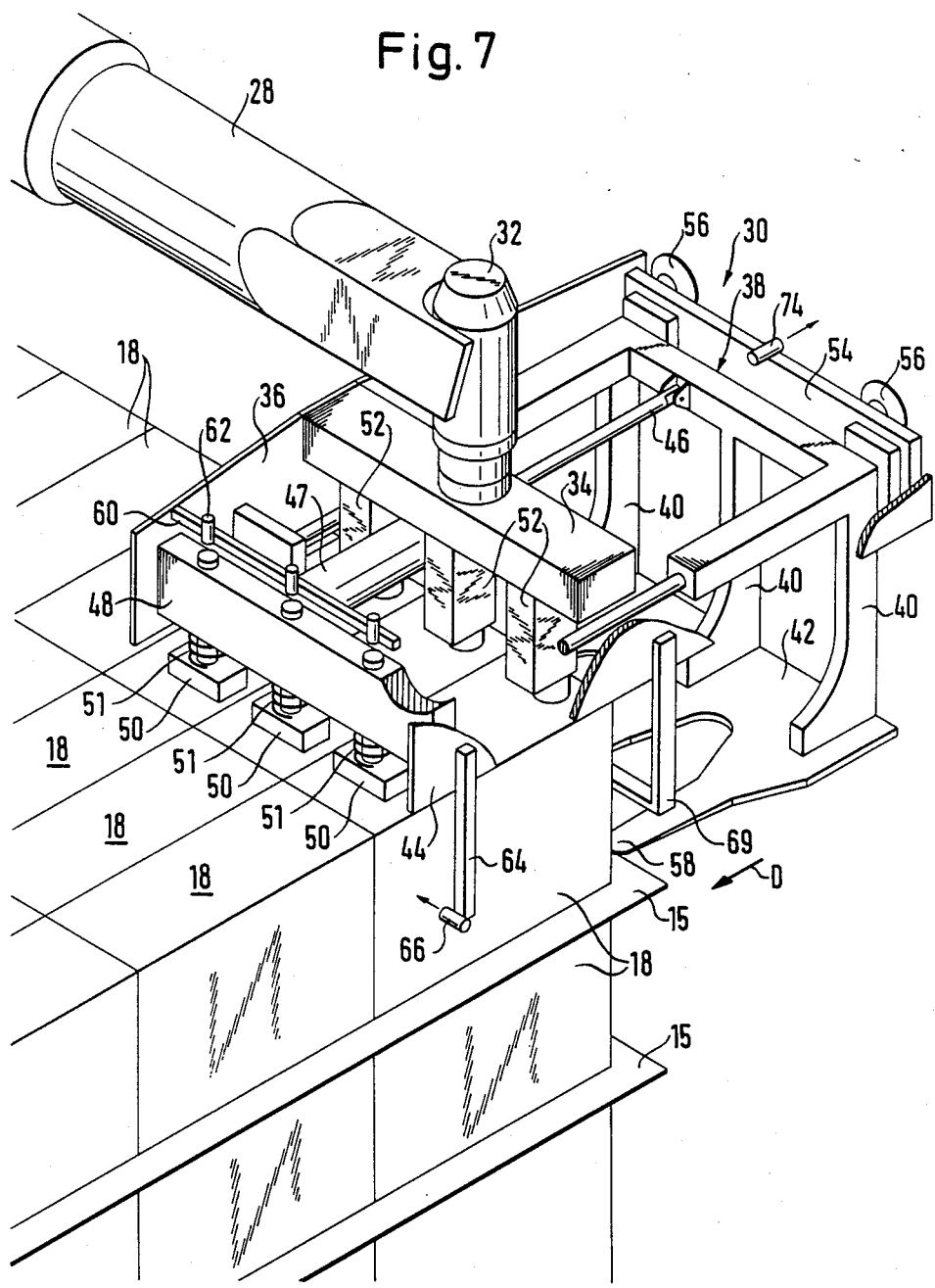
FIG. 7 is a perspective view of the gripper in a fourth or gripping position inserting the fingers into the gap between the stacks and the intermediate support.
Figure 8:
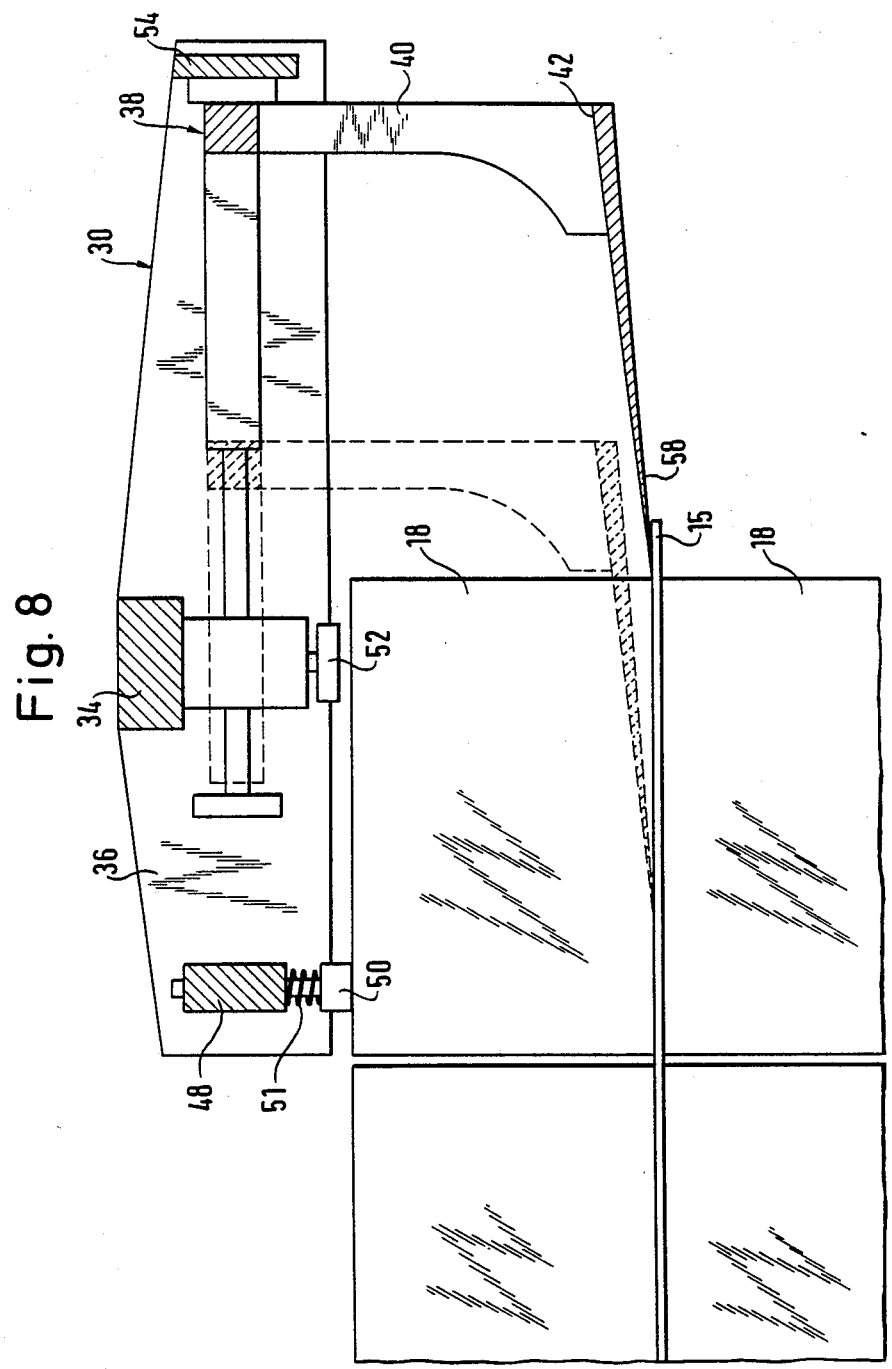
FIG. 8 is a sectional view of the gripper with an illustration of a finger bearing on the intermediate support as shown by FIG. 7 and in the inserted position of the finger.

The carriage 38 is now displaced in the direction of the arrow D in FIG. 7, i.e. in the horizontal direction, so that the fingers 58 are inserted into the gap between the intermediate support 15 and the lowermost blanks of the three stacks as shown by dash lines in FIG. 8. Once the fingers 58 are beneath the blank stacks 18 to the necessary extent, the clamping elements 52 are actuated so as to clamp each of the three stacks 18 between its clamping elements 52 on the one hand and its finger 58 on the other and thus to fix said stacks.

When the three stacks 18 have been fixed by the clamping elements 52 and the fingers 58, said stacks can be lifted by a corresponding movement of the industrial robot 22 and transported to the processing station, i.e. a packing machine. At the latter the gripper with the stacks 18 is set down on a depositing surface. The stacks 18 are again fixed automatically by the pressing elements 50. Then the clamping elements 52 are raised and thereupon the fingers 58 are withdrawn from beneath the stacks 18 so that after moving the gripper 30 away the three stacks 18 are free and can be processed.

If with the starting position shown in FIG. 1 three stacks 18 are carried away in each of three such cycles, i.e. a total of nine stacks 18 are removed, then only two stacks 18 are left. The same cycle then takes place but under the control of the sensor 72 which in accordance with the illustration of FIG. 3 is located at the center stack 18 to detect the right edge of said "stack row".

FIG. 8 shows to an enlarged scale two stacks 18 arranged above each other and separated from each other by an intermediate support 15; the front end of the deformable finger 58 bears on the relatively stiff intermediate support. In the dashed line illustration the carriage and the finger 58 are shifted beneath the stack 18.

Figure 9:
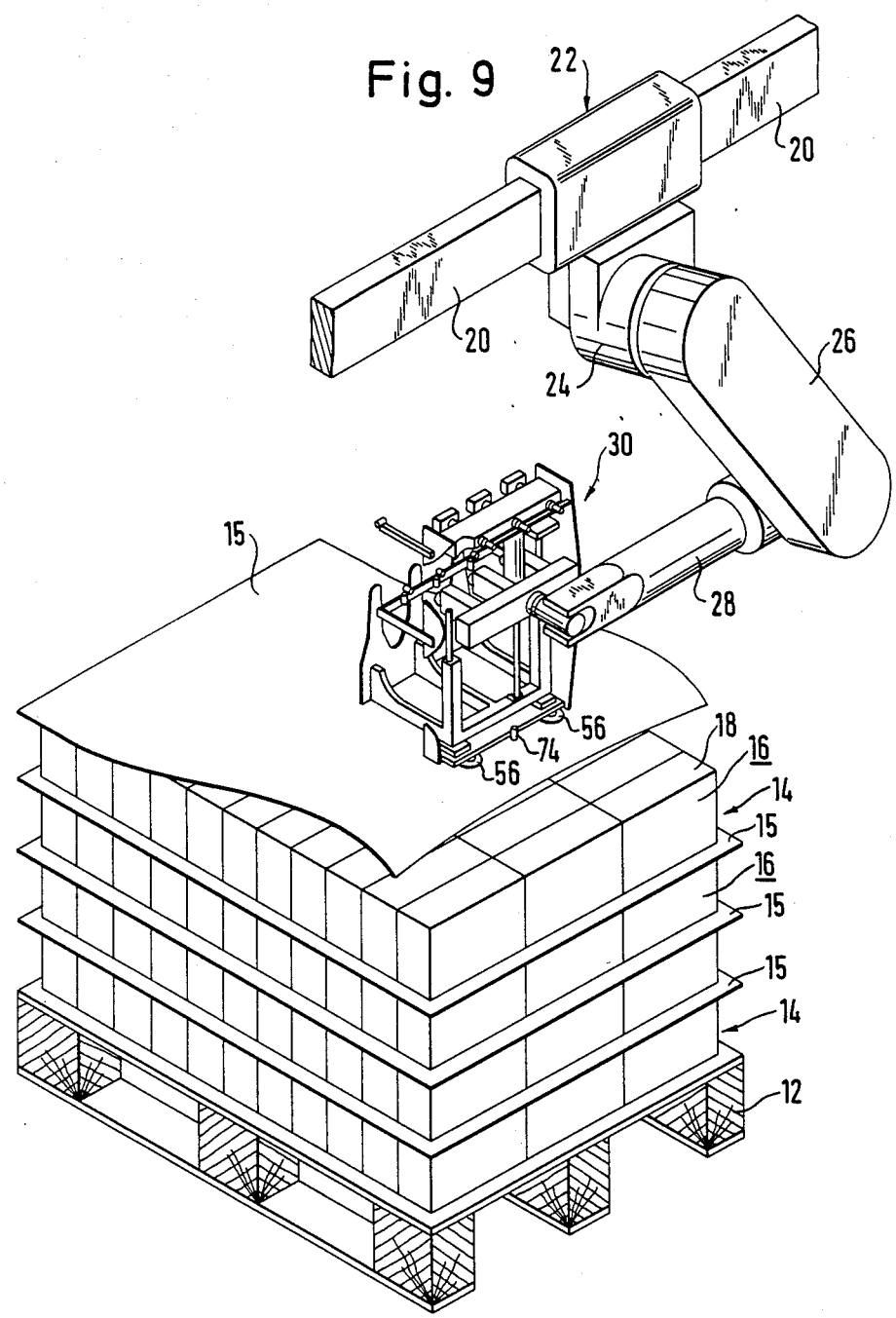
FIG. 9 shows the position of the gripper on lifting the intermediate support.

If an entire stack layer has been cleared the intermediate support 15 is exposed and must be removed. For this purpose the gripper 30 is turned by means of the industrial robot 22 through 90° into the position shown in FIG. 9 in such a manner that the suction heads 56 are facing downwardly. Controlled by the output signal of the sensor 74 the gripper 30 is now moved downwardly until the suction heads 56 bear on the intermediate support 15. The suction heads 56 are now subjected to a vacuum so that the intermediate support adheres to them. By a corresponding travelling movement of the industrial robot 22 the intermediate support 15 can then be removed from the next stack layer 14 in a sort of "peeling movement" and for example discarded as waste.

The next stack layer 14 is now free so that the individual stacks 18, in accordance with the sequence described, can be consecutively grasped, lifted and carried away.

The construction described, in particular the spatial arrangement described for the sensors, is designed for the engagement of pack blanks, that is hinge-lid blanks. By appropriate adaptation of the position of the sensors however other pack blanks or carton blanks can also be gripped in a similar manner.

We claim:
1. A device for lifting at least one material stack from a support, in particular a stack of blanks from an intermediate or bottom support usable in the tobacco industry, wherein:
   (a) a gripper is guided freely movably in all directions by an industrial robot;
   (b) the gripper comprises
      (b1) three clamping elements displaceable in a vertical direction and each element adapted to be placed on adjacently disposed stacks,
      (b2) three elastically deformable fingers with each finger insertable between a stack and the intermediate or bottom support, and
      (b3) sensors for detecting the distance between the gripper and the stack; and
   (c) an evaluating means processing the output signals of the sensors controls
      (c1) the movement of the gripper from a predetermined starting position into a lifting position,
      (c2) the clamping of a stack between a finger and a clamping element, and
      (c3) the lifting and carrying away of each stack.
2. A device according to claim 1, further including means movably connecting each finger to the gripper and each finger is movable in a direction for inserting each finger between a stack of blanks and the intermediate or bottom support.

3. A device according to claim 1, further including a pressing element for each stack to be gripped and each pressing element engages a stack prior to engagement of the stacks by the clamping elements.

4. A device according to claim 3, wherein said pressing elements are resiliently mounted.

5. A device according to claim 1, wherein each material stack is in the form of a rectilinear solid having an upper side, a side wall and an end face, and at least one of said sensors detects the distance between the gripper and the side wall of a stack.

6. A device according to claim 1, wherein each material stack is in the form of a rectilinear solid having an upper side, a side wall and an end face, and at least one of said sensors detects the horizontal distance between the end face of a stack and the gripper.

7. A device according to claim 3, wherein at least one of said sensors detects the vertical distance between the gripper and the upper side of at least one stack.

8. A device according to claim 1, wherein said sensors include a sensor mounted to the gripper which detects changes in the vertical distance between the sensor and a finger due to elastic deformation of the finger.

9. A device according to claim 1, wherein each material stack has an inclined end wall and sensors are provided for detecting the distance between the gripper and said inclined end walls.

10. A device for lifting at least one material stack from a support, in particular a stack of blanks, from an intermediate or bottom support in the tobacco industry wherein:
  (a) a gripper is guided freely movably in all directions by an industrial robot;
  (b) the gripper comprises
    (b1) at least one clamping element displaceable in a vertical direction and adapted to be placed on the stack,
    (b2) at least one elastically deformable finger insertable between the stack and the intermediate or bottom support,
    (b3) sensors for detecting the distance between the gripper and the stack; and
    (b4) suction heads on one side of the gripper for engaging an intermediate support; and
  (c) an evaluating means processing the output signals of the sensors controls
    (c1) the movement of the gripper from a predetermined starting position into a lifting position,
    (c2) the clamping of the stack between the finger and the clamping element,
    (c3) the lifting and carrying away of the or each stack, and
    (c4) movement of the suction heads to contact and remove an intermediate support.

11. A device according to claim 10, and further including at least one additional sensor associated with the suction heads for detecting the distance between an intermediate support and the suction heads.

* * * * *